United States Patent [19]
Michisaka

[11] Patent Number: 6,068,178
[45] Date of Patent: May 30, 2000

[54] FRICTION AGITATION JOINING METHOD AND FRICTION AGITATION JOINING DEVICE

[75] Inventor: Hirozo Michisaka, Osaka, Japan

[73] Assignee: Showa Aluminum Corporation, Osaka, Japan

[21] Appl. No.: 09/105,026

[22] Filed: Jun. 25, 1998

[30] Foreign Application Priority Data

Jun. 26, 1997 [JP] Japan ..................... 9-169701

[51] Int. Cl.⁷ .......................... B23K 31/02; B23K 20/12
[52] U.S. Cl. .................... 228/112.1; 228/112.1; 228/2.1; 228/114; 228/212; 228/44.3
[58] Field of Search ................. 228/112.1, 2.1, 228/114.5, 212, 2.3, 44.3, 44.5; 156/73.5, 580

[56] References Cited

U.S. PATENT DOCUMENTS

| | | | |
|---|---|---|---|
| 4,733,815 | 3/1988 | Sturm | 228/4.1 |
| 5,524,813 | 6/1996 | Pease | 228/212 |
| 5,611,479 | 3/1997 | Rosen | 228/112.1 |
| 5,697,544 | 12/1997 | Wykes | 228/2.1 |
| 5,769,306 | 5/1996 | Colligan | 228/112.1 |
| 5,813,592 | 10/1995 | Midling et al. | 228/112.1 |

FOREIGN PATENT DOCUMENTS

| | | |
|---|---|---|
| 0 653 265 A2 | 5/1995 | European Pat. Off. . |
| 0 810 054 A1 | 12/1997 | European Pat. Off. . |
| 0810054A1 | 12/1997 | European Pat. Off. ............ 228/112.1 |
| 2 306 366 | 5/1997 | United Kingdom . |

*Primary Examiner*—Patrick Ryan
*Assistant Examiner*—Lynne Edmondson

[57] ABSTRACT

A rotating probe 12 is disposed adjacent to a supporting roller 20. Metallic joining members 1, 2, which are butted or stacked to have a joining portion 3, are disposed between the supporting roller 20 and the probe 12 with one surface of the joining members 1, 2 supported by a circumferential peripheral surface of the supporting roller 12, and the rotating probe 12 is inserted into the joining portion 3 of the joining members 12. Then, the joining members 1, 2 are advanced along the joining portion 3 so that a portion of the joining members 1, 2 where the probe 12 contacts is softened by the friction heat generated due to the rotation of the probe 12 and agitated by the probe 12 to thereby join the joining materials 1, 2.

10 Claims, 5 Drawing Sheets

FRICTION AGITATION JOINING METHOD AND FRICTION AGITATION JOINING DEVICE

BACKGROUND OF THE INVENTION

1. Field of the Invention

The present invention relates to a friction agitation joining method and a friction agitation joining device for butt joining or stack joining metallic joining members such as aluminum members, and more particularly to, a friction agitation joining method and a friction agitation joining device for butt joining or stack joining a plurality of metallic joining members to preferably form a large joined member such as a floor member, a wall member, a ceiling member, a scaffold member, or the like.

2. Description of the Related Art

Figure 5:
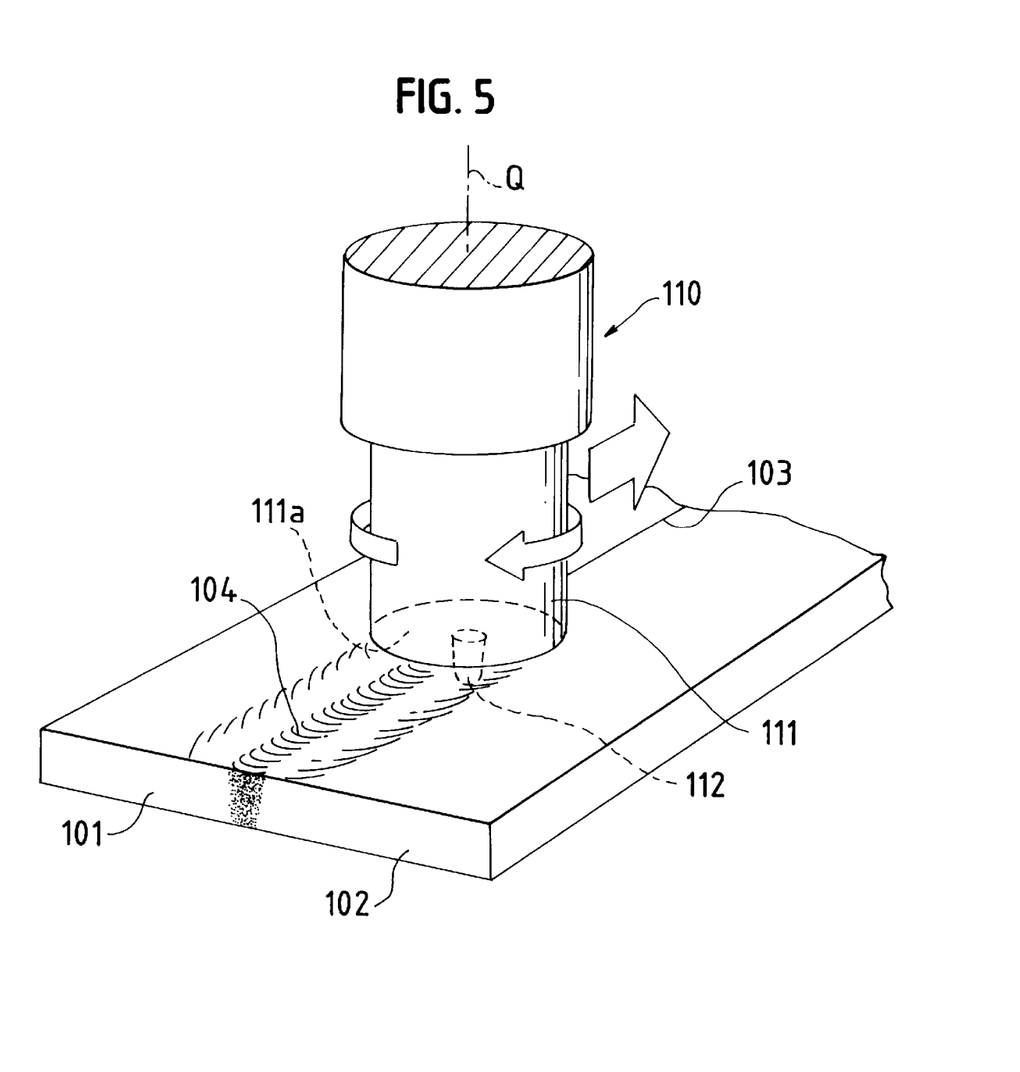
FIG. 5 is a perspective view showing joining members and a conventional joining device.

Conventionally, as a friction agitation joining method, which is one type or solid-phase joining method, the following method has been proposed. In the method, a joining device 110 as shown in FIG. 5 has been used. The joining device 110 is provided with a column-shaped rotor 111 having a larger diameter and a pin-shaped probe 112 having a smaller diameter. The probe 112 is integrally provided on an end of the rotor 111 so as to protrude along an axis Q of the rotor 111, and is made of materials harder than that of members 101, 102 to be joined (hereinafter referred to as "joining members"). While rotating the rotor 111 at high speed, the probe 112 is inserted into a butted portion 103, or there-around, of the two metallic joining members 101, 102.

Generally, such insertion of the probe 112 will be performed until a tip end of the probe 112 reaches a portion nearby a rear surface of the joining members 101, 102. In FIG. 5, a flat shoulder portion 111a, an end face, of the rotor 111 touches the joining members 101, 102. And then, while the probe 112 is inserted in the butted portion 103 of the joining members 101, 102, the probe 112 is advanced against the joining members 101, 102 along the butted portion 103.

At a portion of the joining members 101, 102 that the probe 112 contacts and there-around, the materials of the joining members 101, 102 will be softened by the friction heat generated due to the rotation of the probe 112 as well as the contact of the shoulder portion 111a of the rotor 111 and the joining members 101, 102, and agitated by the probe 112. In accordance with the advancing movement of the probe 112, the softened and agitated materials or the joining members 101, 102 are plastically fluidized to go around the probe 112 and to fill up a grove formed behind the probe 112 as it moves by the pressure caused by the advancing movement of the probe 112. Then, the materials will be cooled and solidified by the immediate loss of such friction heat. This phenomenon will be repeated with the advancing movement of the probe 112, which causes the joining members 101, 102 to be joined. In FIG. 5, the reference numeral 104 denotes a joined portion of the joining members 101, 102.

This friction agitation joining method has advantages in that the metallic joining members 101, 102 are not limited to specific kinds of materials because the joining method is one type of solid-phase joining method and the deformation of the joining members caused by heat stress is smaller as compared to melt joining methods such as a MIG welding method, a TIG welding method, or the like.

In the above-mentioned conventional friction agitation joining method, the joining members 101, 102 are fixed on a bed (not shown). The probe 112 is inserted into the butted portion 103 or the stacked portion of the joining members 101, 102. And then, the probe 112 or the bed to which the joining members 101, 102 are fixed is moved in a predetermined direction to join the joining members 101, 102.

To obtain a joined material with an uniformly joined portion, it is required to advance the probe 112 or the bed while the distance between the tip end of the probe 112 and the rear surface of the joining members 101, 102 is kept constant.

However, it is difficult to keep the distance constant along the whole length of the butted portion 103 or the stacked portion. Therefore, during the advancement of the probe 112 or the bed, the tip end of the probe 112 may stick out from the rear surface of the joining members 101, 102, or may not be inserted enough into the joining members 101, 102. Thus, it is difficult to obtain a joined material with a uniformly joined portion by the friction agitation joining method.

SUMMARY OF THE INVENTION

An object of the present invention is to provide a friction agitation joining method and a friction agitation joining device for joining metallic joining members which can join the joining members to obtain a joined member with a uniformly joined portion and which can join the joining members without causing joining defects even if there are gaps at a butted portion of the joining members.

In order to achieve the above mentioned object, a friction agitation joining method according to the present invention preferably includes the steps of:

- disposing a rotating probe adjacent to a circumferential surface of a supporting roller for supporting metallic joining members, the joining members being butted or stacked to have a joining portion;
- disposing the joining members between the supporting roller and the probe with one surface of the joining members supported on a peripheral surface of the supporting roller;
- inserting the rotating probe into the joining portion; and
- advancing the joining members so that a portion of the joining members where the probe contacts is softened by the friction heat generated due to the rotation of the probe and is agitated by the probe to thereby join the joining materials.

In the method, the distance between the tip end of the probe and the circumferential surface of the supporting roller is kept constant even if the supporting roller rotates. Therefore, the joining members can advance while the distance between the tip end of the probe inserted into the joining portion and the rear surface of the joining members, i.e., a surface of the joining members opposite to a surface from which the probe is inserted, is kept constant. As a result, a joined member with a uniformly joined portion can be obtained.

In the above-mentioned method, due to the following reasons, it is preferable that the distance between the tip end of the probe and the circumferential surface of the supporting roller is from 0.05 to 0.4 mm. The distance is preferably as small as possible. However, if the distance is smaller than 0.05 mm, the tip end or the probe unfavorably contacts the circumferential surface of the supporting roller to cause damage of the probe and/or the supporting roller. On the other hand, if the distance is larger than 0.4 mm, a distance between the tip end of the probe and the rear surface of the joining members becomes too far, which prevents a portion nearby the rear surface of the joining portion of the joining members from being softened and agitated, resulting in poor joining.

It is preferable that a driving roller and a pressing roller are disposed so that the joining members are pressed onto a circumferential surface of the driving roller by the pressing roller and are driven by the driving roller. This enables easy advance movement of the joining members.

In a butt joining, it is preferable that a pair of rotatable guide rollers are disposed on both sides of the advancing direction of the joining members for pressing the joining members against each other. This can prevent air from being drawn into the joined portion even if a gap exists in a butted portion of the joining members because the softened portion in the butted portion can easily fit together and deform so as to squeeze the air out of the butted portion.

A friction agitation joining device according to the present invention for joining a joining portion such as a butted portion or a stacked portion of two metallic joining members, preferably comprises:

a supporting roller having a circumferential surface;

a joining device having a rotating probe disposed adjacent to the circumferential surface; and a driving device for advancing the joining members supported by the supporting roller and disposed between the probe and the supporting roller while the rotating probe is inserted into the joining portion, whereby a portion of the joining members where the probe contacts is softened by a friction heat generated due to rotation of the probe and is agitated by the probe to thereby join the joining materials.

This enables the joining members to advance while the distance between the tip end of the probe inserted into the joining portion and the rear surface of the joining members is kept constant, resulting in a joined member with a uniformly joined portion.

According to the device, the joining members can advance while the distance between the tip end of the probe inserted into the joining portion and the rear surface of the joining members, i.e., a surface of the joining members opposite to a surface from which the probe is inserted, is kept constant. As a result, a joined member with a uniformly joined portion can be obtained.

In the friction agitation joining device, it is preferable that a pair of rotatable guide rollers are disposed on both sides of the advancing direction of the joining members for pressing the joining members against each other. This can prevent air from being drawn into the joined portion even if a gap exists in a butted portion of the joining members because the softened portion in the butted portion can easily fit together and deform so as to squeeze the air out of the butted portion.

Other objects and features will be apparent from the following detailed description of the invention with reference to the attached drawings.

BRIEF DESCRIPTION OF THE DRAWINGS

The preferred embodiments of the present invention will be more fully detailed and the present invention will be better understood from the following description, taken with the appended drawings, in which.

DETAILED DESCRIPTION OF THE PREFERRED EMBODIMENTS

The term "aluminum" used in this specification denotes aluminum and its alloys.

Preferred embodiments of the friction agitation joining method for joining metallic joining members according to the present invention will now be described, in detail, with reference to the accompanying drawings.

Figure 1:
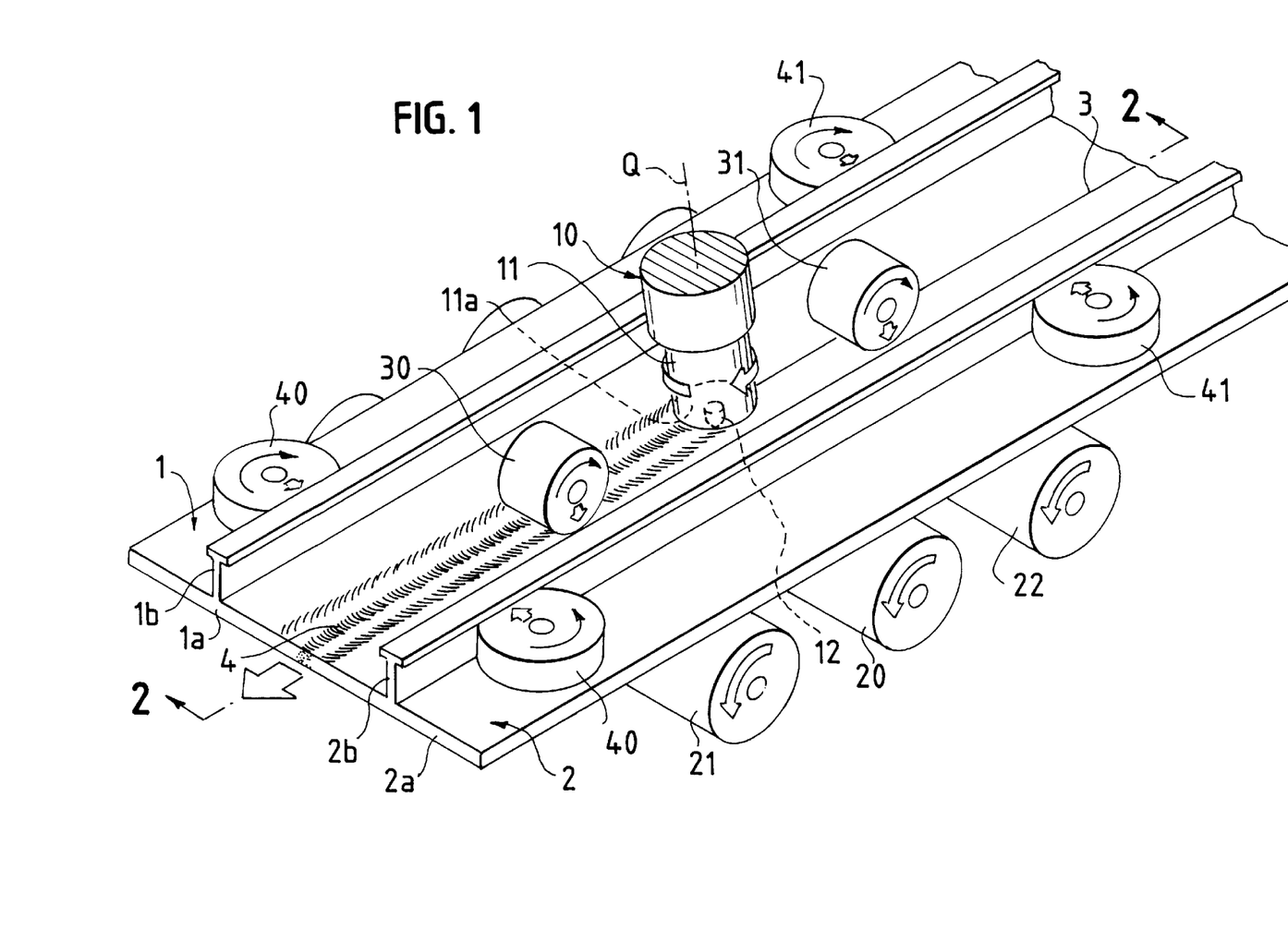
FIG. 1 is a perspective view of an embodiment of a friction agitation joining device and a friction agitation joining method according to the present invention.
Figure 2:
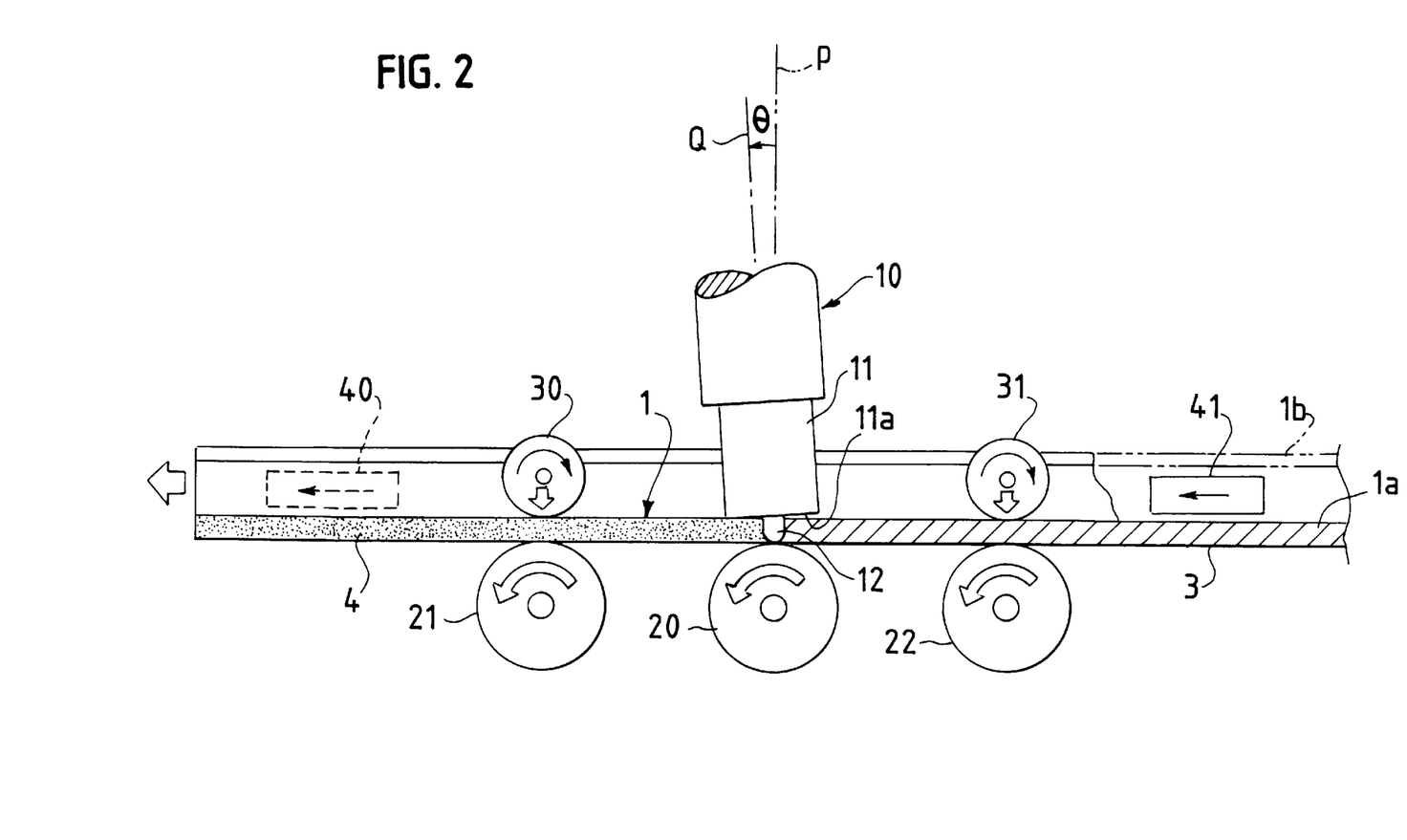
FIG. 2 is a cross-sectional view taken along the line 2—2 of FIG. 1.
Figure 3:
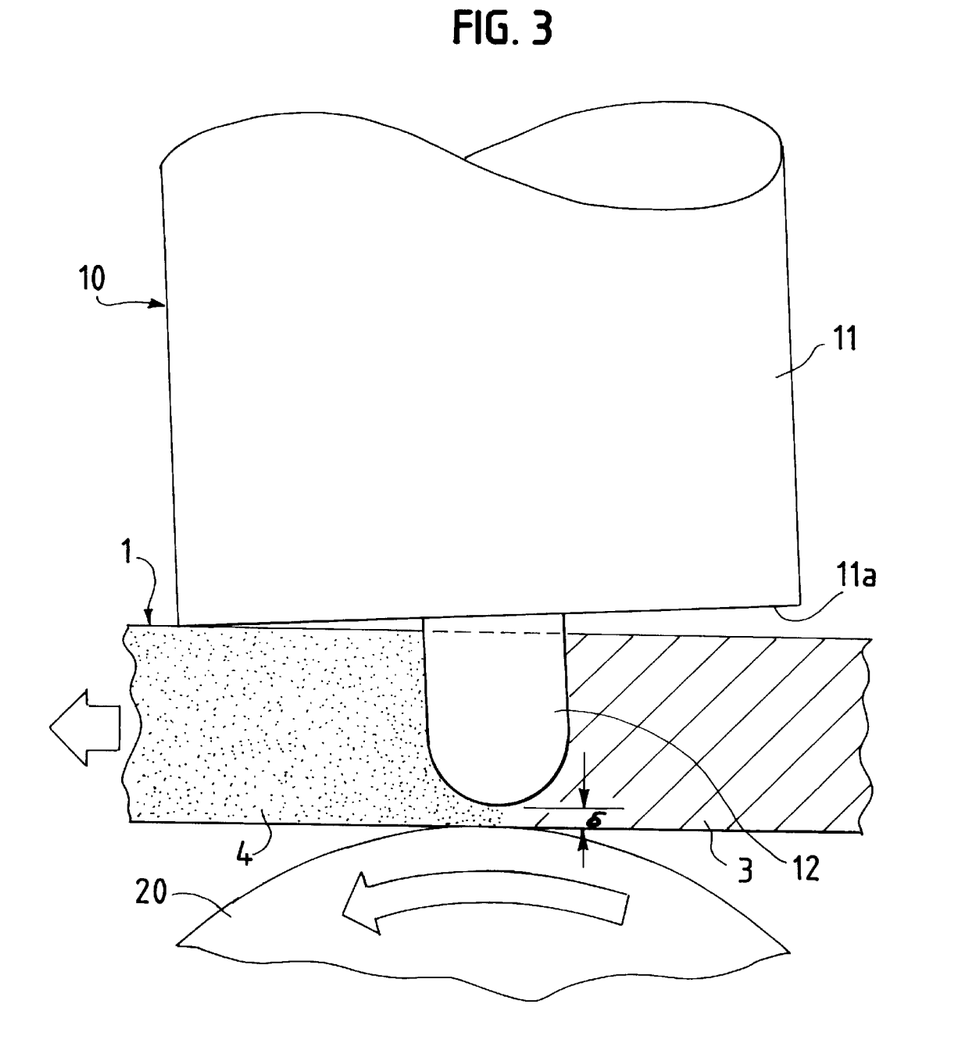
FIG. 3 is a partially enlarged view of FIG. 2.

FIGS. 1 to 3 show an embodiment of a friction agitation joining device for butt joining two long plate-shaped joining members 1, 2 to obtain a panel used as a floor panel of a large ship.

As shown in FIG. 1, each of the joining members 1, 2 is an extruded aluminum article including a belt-shaped flat portion 1a, 2a and a leg portion 1b, 2b. The leg portion 1b, 2b is, at the middle portion in the width direction of the joining member 1a, 2a, perpendicularly formed on a rear surface of the joining member 1a, 2a along the length thereof. The joining members 1a, 1b are placed upside down with their edges butting.

A friction agitation joining device according to the embodiment will be explained as follows.

As shown in FIGS. 1 to 3, the reference numeral 20 denotes a column-shaped supporting roller for supporting the joining members 1a, 1b from the underside thereof. The butted joining members 1a, 2a are disposed on the supporting roller 20 in such a state that the rear surface, one of the surfaces in the thickness direction of the joining members 1a, 2a, touches the circumferential surface of the supporting roller 20 and the supporting roller 20 is perpendicular to the longitudinal direction of the joining members 1a, 2a. The supporting roller 20 has a length slightly longer than the width of the butted joining members 1a, 2a so that the butted joining members 1a, 2a can be surely supported. The roller 20 is driven by a driving mechanism (not shown) to advance the joining members 1a, 2a, which are supported by the roller 20, in the longitudinal direction of the joining members 1a, 2a. Thus, the supporting roller 20 can also function as a driving roller.

At a portion above the supporting roller 20 where a butted portion 3 of the joining members 1, 2 passes, a joining device 10 is disposed. The joining device 10 is provided with a column-shaped rotor 11 having a larger diameter and a pin-shaped probe 12 having a smaller diameter. The probe 12 is integrally provided on a flat shoulder portion 11a of the rotor 11 so as to protrude along an axis Q thereof. The probe 12 is disposed so as to come close to the circumferential surface of the supporting roller 20. In the joining device 10, the probe 12 rotates together with the rotor 11. The probe 12 and the rotor 11 are made of materials that are harder than that of the joining members 1, 2 and can endure friction heat generated when the joining members 1, 2 are joined. The probe 12 has an uneven surface (not shown) for agitating the butted portion 3.

By disposing the supporting roller 20 and the probe 12 as mentioned above, the butted joining members 1, 2 can be disposed between the supporting roller 20 and the probe 12 with one surface of the joining members 1, 2 supported by a circumferential surface of the supporting roller 20, and the probe 12 can be inserted into the butted portion 3 of the joining members 1, 2.

As shown in FIG. 3, the probe 12 is preferably disposed such that the distance 6 between the tip end of the probe 12 and the circumferential surface of the supporting roller 20 falls within the range of from 0.05 to 0.4 mm. If the distance δ is smaller than 0.05 mm, the tip end of the probe 12 can unfavorably contact the circumferential surface of the supporting roller 20 to cause damage to the tip end of the probe 12 and/or to the circumferential surface of the supporting roller 20. On the other hand, if the distance δ is larger than 0.4 mm, the distance between the tip end of the probe 12 and the rear surface of the joining members 1, 2 becomes too far, which prevents a portion near the rear surface of the butted portion 3 of the joining members 1, 2 from being softened and agitated, resulting in poor joining.

As shown in FIG. 2, the joining device 10 inclines by an inclined angle θ toward the advancing direction of the joining members 1, 2 with an edge of the shoulder portion 11a touching a downstream portion of the joining members 1, 2 and lifting up from an upstream portion of the joining members 1, 2.

By disposing the joining device 10 as mentioned above, the following effects can be obtained. Because an edge of the shoulder portion 11a touches a downstream portion of the joining members 1, 2, the softened materials can be prevented from being scattered, and the softened materials are pressed by the edge of the shoulder portions 11a to surely obtain a uniformly joined portion. Further, as friction heat is generated due to the friction between the shoulder portion 11a and the softened materials, the portion that the probe 12 contacts and therearound are further softened, which enables the shoulder 11a to flatten the upper surface of the joining members 1, 2.

Because an edge of the shoulder portion 11a is slightly lifted up from an upstream portion of the joining members 1, 2, the edge of the shoulder portion 11a can be prevented from being caught by minute protrusions (not shown), which may exist on the surface of the joining members 1, 2, thereby resulting in a smooth passing of the probe 12 along the butted portion 3.

It is preferable that the inclined angle θ falls within the rage of from 1 to 6°. If the angle θ is smaller than 1°, the edge of the shoulder portion 11a may be caught by minute protrusions, which may exist on the upper surface of the upper stream portion of the joining members 1, 2. On the other hand, if the angle θ exceeds 6°, the shoulder portion 11a can scrape the upper surface of the downstream portion of the joining members 1, 2 too much, which may cause burrs.

The joining device 10 preferably goes up and down by an elevator (not shown). The operation of the elevator enables a fine adjustment of the distance δ between the tip end of the probe 12 and the circumferential surface of the supporting roller 20. It also enables the probe 12 to be inserted into the joining members 1, 2, and to be pulled out of the joining members 1, 2.

As shown in FIGS. 1 and 2, column-shaped driving rollers 21, 22, each having the same shape and size as the supporting roller 20 and driven by a driving mechanism (not shown), are disposed parallel to the supporting roller 20 at both fore and aft positions of the supporting roller 20 in relation to the advancing direction of the joining members 1, 2. These driving rollers 21, 22 comprise a driving means for advancing the joining members 1, 2 in the longitudinal direction thereof. These driving rollers 21, 22 and the supporting roller 20 are synchronously driven.

At the fore and aft positions of the probe 12 in the advancing direction of the joining members 1, 2, rotatable pressing rollers 30, 31, each having the same shape and size and pressed by a pressure mechanism (not shown), are disposed so as to oppose the driving rollers 21, 22. These pressing rollers 30, 31 press the joining members 1, 2, which are supported by the supporting roller 20, against the circumferential surface of the driving rollers 21, 22.

The joining members 1, 2 are pressed onto the circumferential surface of the driving rollers 21, 22 by the pressing rollers 30, 31 to advance the joining members 1, 2 without slipping while the joining members 1, 2 are disposed between the supporting roller 20 and the probe 12 with the rear surface of the joining members 1, 2 supported by the circumferential surface of the supporting roller 20, and with the probe 12 inserted into the joined portion 3. Because the pressing rollers 30, 31 can rotate, the pressing rollers 30, 31 rotate on the joining members 1, 2 with the circumferential surface thereof pressing on the surface of the joining members 1, 2 in accordance with the advancing movement of the joining members 1, 2.

As shown in FIG. 1, at the fore and at positions of the probe 12, a pair of guide rollers 40, 41, which are the same shape and size, are disposed on both sides in the advancing direction of the joining members 1, 2 with the circumferential surfaces of the guide rollers 40, 41 pressing against the outer surfaces of the leg portions 1b, 2b. These guide rollers 40, 41 adjust the position of the joining members 1, 2 such that the butted portion 3 thereof is located at a portion where the probe 12 passes, and the guide rollers 40, 41 press the joining members 1, 2 against each other. Since the guide rollers 40, 40, 41, 41 are rotatable, the guiding rollers can rotate on the outer surface of the leg portions 1b, 2b of the joining members 1, 2 in accordance with the advancing movement of the joining members 1, 2.

A friction agitation joining method by the above-mentioned friction agitation joining device will be explained as follows.

In a state where the probe 12 is in a standby position above the supporting roller 20, one longitudinal end of the butted joining members 1, 2 is inserted between the rotating driving roller 22 and the pressing roller 31. In this state, the leg portions 1b, 2b of the butted joining members 1, 2 are inwardly pressed by the guide rollers 41, 41, which causes the butted portion 3 to be positioned at a portion where the probe 12 passes and to press the joining members 1, 2 against each other.

The joining members 1, 2 passed between the driving roller 22 and the pressing roller 31 are pressed onto the driving roller 22 by the pressing roller 31, which in turn gives a driving force to the joining members 1, 2 by the driving roller 22. Thus, the joining members 1, 2 advance between the supporting roller 20 and the probe 12.

When the starting position for joining the butted portion 3 of the joining members 1, 2 arrives at the portion above the circumferential surface of the supporting roller 20, the advancing movement of the joining members 1, 2 is stopped. Then, the probe 12 is descended while rotating the probe 12. When the tip end of the probe 12 touches the butted portion 3 of the joining members 1, 2, the materials that the probe 12 contacts will be softened by the friction heat generated by the friction between the probe 12 and the joining members 1, 2. Then, the probe 12 is further pushed down to be inserted into the butted portion 3 and is stopped and fixed when the distance δ between the tip end of the probe 12 and the circumferential surface of the supporting roller 20 is from 0.05 to 0.4 mm.

Thus, the joining members 1, 2 are disposed between the supporting roller 20 and the probe 12 with the probe 12 inserted into the butted portion 3. In this state, the rear surface of the butted portion 3 is supported by the circumferential surface of the supporting roller 20.

Alternatively, after the probe 12 goes down, the joining members 1, 2 may be forcibly inserted between the probe 12 and the supporting roller 20 so that the probe 12 is inserted into the butted portion 3 from the front edge of the joining members 1, 2.

Next, the driving rollers 21, 22 and the supporting roller 20 are driven again. As a result, the joining members 1, 2 with the butted portion 3 into which the probe 12 is inserted is forced to advance by the supporting roller 20. The joining members 1, 2 are forced to advance by the driving roller 22 and the supporting roller 20 between the driving roller 21 and the pressing roller 30 such that the probe 12 moves along the butted portion 3 while the probe 12 is inserted in the butted portion 3.

Because the joining device 10 is slightly inclined toward the advancing direction of the joining members 1, 2, an edge of the shoulder portion 11a touches a downstream portion of the joining members 1, 2 and is lifted up from an upstream portion of the joining members 1, 2.

The joining members 1, 2 inserted between the driving roller 21 and the pressing roller 30 is pressed onto the circumferential surface of the driving roller 21 by the pressing roller 30. Therefore, the joining members 1, 2 are forced to advance by the driving roller 21. The joining members 1, 2 are moved between the guide rollers 40, 40 by the driving force of the driving rollers 22, 21 and supporting roller 20. Thus, outer surfaces of the leg portions 1b, 2b are pressed by the circumferential surface of the guide rollers 40, 40.

When the joining members 1, 2 move so that the butted portion 3 passes the probe 12, the portion where the probe 12 touches is softened due to the friction heat and agitated by the probe 12 to join the butted portion 3 of the joining members 1, 2. In detail, the materials or the butted portion where the probe 12 contacts and a region there-around will be softened by the friction heat generated due to the rotation of the probe 12 and due to the friction between the edge of the shoulder portion 11a and the upper surface of the joining members 1, 2, and will be agitated. In accordance with the advancing movement of the joining members 1, 2, the softened and agitated materials of the joining members 1, 2 are plastically fluidized to fill up a groove formed behind the advancing movement of the probe 12. Then, the materials will be cooled and solidified by the immediate loss of the friction heat. This phenomenon will be repeated with the advancing movement of the probe 12, which enables a friction agitation joining of the butted portion 3 of the joining members 1, 2 along the whole length thereof.

Because the joining members 1, 2 advance while an edge of the shoulder portion 11a touches a downstream portion of the joining members 1, 2, the softened materials can be prevented from being scattered, and the softened materials are pressed by the edge of the shoulder portions 11a to surely obtain a uniformly joined portion. Further, the upper surface of the joining members 1, 2 can be flattened.

Because the distance between the tip end of the probe 12 and the circumferential surface of the supporting roller 20 is kept constant even if the supporting roller 20 rotates, the joining members 1, 2 can advance while the distance δ between the tip end of the probe 12 and the rear surface of the joining members 1, 2 is kept constant, resulting in a uniformly joined portion.

Because the joining members 1, 2 are pressed against each other by the guide rollers 40, 40, 41, 41, the softened portions in the butted portion 3 can easily fit with each other and deform, which causes a disappearance of a gap formed in the butted portion 3 to squeeze air within the gap out of the joined portion 4. As a result, air can be prevented from being drawn into the joined portion 4.

Thus, the joining members 1, 2 can integrally be joined to form a high quality joined member with a uniformly joined portion 4 with less defects and into which little air is drawn.

In the above-mentioned friction agitation joining device, because the driving rollers 21, 22 and the pressing rollers 30, 31 are disposed at the fore and aft position in the advancing direction of the joining members 1, 2, the following problems can be solved.

Figure 4:
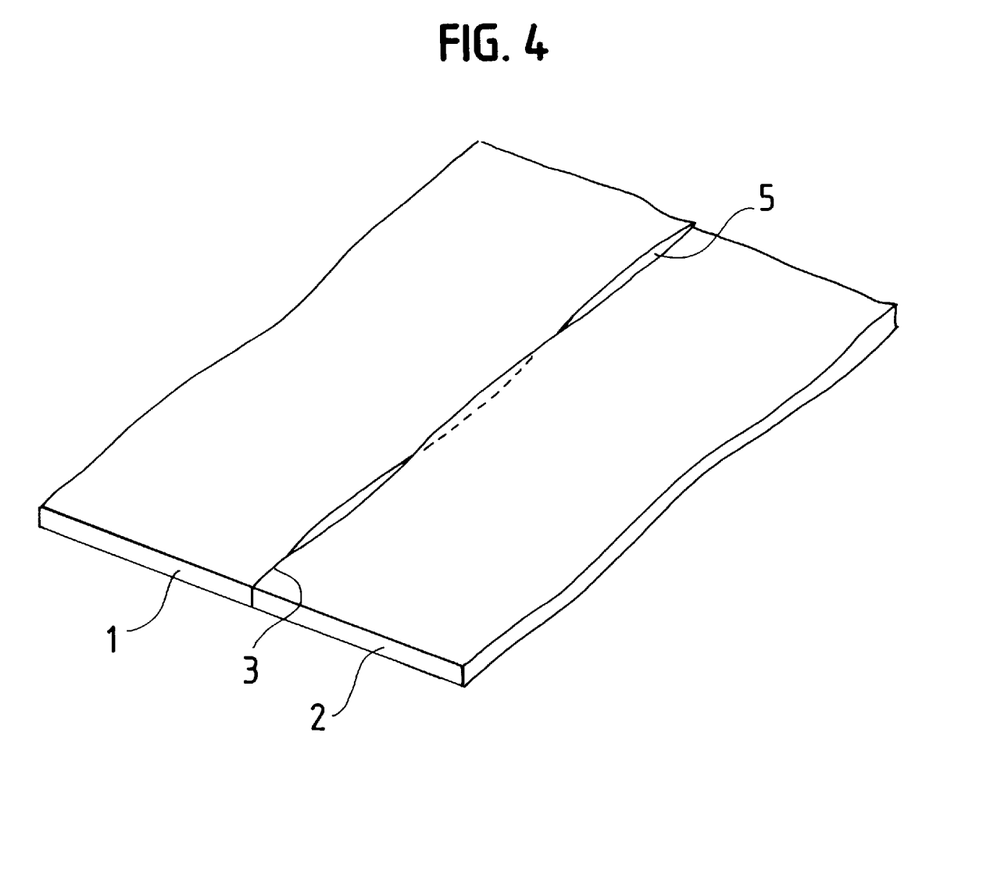
FIG. 4 is a perspective view showing undulated joining members which are butted against each other.

As shown in FIG. 4, joining members 1, 2, especially thin and long joining members, are not always flat, i.e., they may be warped or twisted. When these joining members 1, 2 are butted against each other, level differences 5 or gaps (not shown) may be formed at the butted portion 3. Therefore, performing butt joining under such a situation may cause joint defects or poor joint strength.

When the above-mentioned joining members 1, 2 are stacked, gaps may be formed at the stacked portion due to the warped or twisted portions. Therefore, performing stack joining under such a situation may also cause poor joint efficiency. Especially, because friction agitation joining is one type of solid-phase joining method, a slight gap formed at the butted portion 3 or the stacked portion may cause heavily decreased joint efficiency. In joining thin and long joining members by a friction agitation joining method, the joining members may be deformed. Therefore, it is very hard to obtain a high quality jointed member.

In the embodiment, the driving rollers 21, 22 and the pressing rollers 30, 31 are disposed at the fore and aft positions of the supporting roller 20 and the probe 12 in the advancing direction of the joining members 1, 2.

Therefore, the joining members 1, 2 passing through the friction agitation joining device are, at the upstream portion and at the downstream portion, pressed by the pressing rollers 30, 31 to correct a warped or twisted portion into a flat portion between the pressing rollers 30, 31, which causes an increase in the contact area of the joining members 1, 2, resulting in an increased joining efficiency. The joining members 1, 2 are joined in a flattened state between the pressing rollers 30, 31, which can prevent joint defects from occurring.

Because the joining members 1, 2 are joined in such a state that portions of the joining members 1, 2 located fore and aft of the probe 12 are pressed by the fore and aft pressing rollers 30, 31, generation of stress due to the joining can be restrained, thereby decreasing the deformation of the joining members 1, 2.

The present invention is not limited to the above embodiment.

The present invention is not only applicable to the manufacture of a panel member for use in a ship floor, but to the manufacture of any joined members.

The supporting roller 20 is not limited to a driven-type roller, but may be a non-driven-type roller.

The driving rollers 21, 22 comprising a driving mechanism may be disposed at at least one side of the joining members 1, 2 in the direction of the thickness.

The joining members which can be applied to the present invention may be metals other than aluminum, such as steel, copper, brass, or the like, and may be made by a method other than an extrusion method, such as casting, forging, die casting, or the like.

The present invention is not limited to the above-mentioned embodiment in which the probe 12 is inserted into the butted portion 3 of the two metallic joining members 1, 2 which are disposed so as to butt against each other to integrally join the joining members 1, 2. Alternatively, the probe 12 may be inserted between two metallic joining members 1, 2 which are disposed so as to be stacked on their broad side portions.

In the friction agitation joining method according to the present invention, the distance between the tip end of the probe and the surface of the supporting roller is kept constant even if the supporting roller rotates. Therefore, the joining members can advance while the distance between the tip end of the probe inserted into the joining portion and the rear surface of the joining members, i.e., a surface of the joining members opposite to a surface from which the probe is inserted, is kept constant. Therefore, problems such that the tip end of the probe sticks out from the rear surface of the joining members, or is not inserted enough into the joining members can be prevented from occurring. As a result, a joined member with a uniformly joined portion can be obtained.

In a case where the distance between the tip end of the probe and the circumferential surface of the supporting roller falls within the range of from 0.05 to 0.4 mm, contact between the tip end of the probe and the circumferential surface of the supporting roller can be prevented from occurring, and joint defects due to a lack of insertion of the probe can be avoided.

In a case where a driving roller and a pressing roller are disposed so that the joining members are pressed onto a circumferential surface of the driving roller by the pressing roller and are driven by the driving roller, the joining members can be easily moved.

In a case where a pair of rotatable guide rollers are disposed on both sides in the advancing direction of the joining members for pressing the joining members against each other, air can be prevented from being drawn into the joined portion even if a gap exists in a butt portion of the joining members because the softened portion in the butt portion can easily fit together and deform so as to squeeze the air out of the butt portion. Therefore, the generation of a void in the joined portion can be avoided, resulting in a high quality joined member with less join defects.

According to the friction agitation joining device of the present invention, the distance between the tip end of the probe inserted into the joining portion and the rear surface of the joining members is kept constant, resulting in a joined member with a uniformly joined portion.

In a case where a pair of rotatable guide rollers are disposed on both sides in the advancing direction of the joining members for pressing the joining members against each other, air can be prevented from being drawn into the joined portion to obtain a high quality butt joined member with no joining defects.

Although preferred embodiments according to the present invention have been described, it should be recognized that various modifications are possible within the scope of the present invention. In addition, this application claims priority to Patent Application No. H9 (1997)-169701 filed in Japan on Jun. 26, 1997, the disclosure of which is incorporated by reference in its entirety.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A friction agitation joining method including the steps of:

disposing a rotating probe adjacent to a circumferential surface of a supporting roller for supporting metallic joining members, said joining members being butted or stacked to have a joining portion;

disposing said joining members between said supporting roller and said probe with one surface of said joining members supported on a peripheral surface of said supporting roller;

inserting said rotating probe into said joining portion;

advancing said joining members so that a portion of said joining members where said probe contacts is softened by said friction heat generated due to said rotation of said probe and is agitated by said probe to thereby join the joining materials;

maintaining a distance between the tip end of the probe and a circumferential surface of the supporting roller from 0.05 to 0.4 mm; and disposing a driving roller and a pressing roller so that said joining members are pressed onto said circumferential surface of said driving roller by said pressing roller and are driven by said driving roller.

2. The friction agitation joining method as recited in claim 1, wherein said driving roller and said pressing roller are disposed at portions fore and aft of said supporting roller and said probe.

3. The friction agitation joining method as recited in claim 1, wherein pairs of guide rollers are disposed so that said joining members are butt joined while said joining members are pressed against each other by said pairs of guide rollers, one of said pair of guide rollers being disposed in front of said supporting roller and said probe, the other of said pair of guide rollers being disposed behind thereof.

4. The friction agitation joining method as recited in claim 1, wherein said joining members are advanced while said joining device, which has said probe protruding from an end face of a rotor along an axis thereof, inclines toward said advancing direction of said joining members with an edge of said end face touching a downstream portion of said joining members and lifting up from an upstream portion of said joining members.

5. The friction agitation joining method as recited in claim 4, wherein an inclined angle of said joining device, which is formed between said axis of said rotor and a direction perpendicular to a portion of said joining member contacting said supporting roller, is from 1 to 6°.

6. A friction agitation joining device for joining a joining portion of two metallic joining members, comprising:

a supporting roller having a circumferential surface;

a joining device having a rotating probe disposed adjacent to said circumferential surface;

a driving device for advancing said joining members supported by said supporting roller and disposed between said probe and said supporting roller while said rotating probe is inserted into said joining portion, whereby a portion of said joining members where the probe contacts is softened by a friction heat generated due to a rotation of said probe and is agitated by said probe to thereby join said joining materials;

a distance between a tip end of said probe and a circumferential surface of said supporting roller being from 0.05 to 0.4 mm;

said driving device comprising a driving roller disposed on at least one surface of said joining members; and a rotatable pressing roller disposed opposite to said driving roller for advancing said joining members while pressing said joining members onto said circumferential surface of said driving roller.

7. The friction agitation joining device as recited in claim 6, wherein said driving rollers and pressing rollers are disposed both in front and behind of said supporting roller and said probe, respectively.

8. The friction agitation joining device as recited in claim 6, further comprising a pair of guide rollers disposed on both sides of said advancing direction for pressing said joining members against each other.

9. The friction agitation joining device as recited in claim 6, wherein said joining device comprises a rotor and said probe protruding from an end face of said rotor along an axis thereof, and wherein said joining device is disposed so as to incline toward said advancing direction of said joining members with an edge of said end face touching a downstream portion of said joining members and lifting up from an upstream portion of said joining members.

10. The friction agitation joining device as recited in claim 6, wherein said joining device is inclined such that an inclined angle of said joining device, which is formed between said axis of said rotor and a direction perpendicular to a portion of said joining member contacting said supporting roller, is from 1 to 6°.

* * * * *